United States Patent
Hickman et al.

(10) Patent No.: US 10,118,375 B2
(45) Date of Patent: *Nov. 6, 2018

(54) EXTRUDED DEPOSITION OF POLYMERS HAVING CONTINUOUS CARBON NANOTUBE REINFORCEMENTS

(71) Applicant: The Boeing Company, Chicago, IL (US)

(72) Inventors: Gregory James Schoepen Hickman, University City, MO (US); Gregg Robert Bogucki, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 628 days.

This patent is subject to a terminal disclaimer.

(21) Appl. No.: 14/602,964

(22) Filed: Jan. 22, 2015

(65) Prior Publication Data

US 2016/0082659 A1 Mar. 24, 2016

Related U.S. Application Data

(63) Continuation-in-part of application No. 14/489,972, filed on Sep. 18, 2014.

(51) Int. Cl.
| | | |
|---|---|---|
| *B29C 67/00* | (2017.01) | |
| *B33Y 10/00* | (2015.01) | |
| *C08J 5/00* | (2006.01) | |
| *B05D 1/26* | (2006.01) | |
| *B29C 70/24* | (2006.01) | |
| *B33Y 30/00* | (2015.01) | |
| *B29K 105/12* | (2006.01) | |
| *B29K 307/04* | (2006.01) | |
| *B29B 15/12* | (2006.01) | |

(52) U.S. Cl.
CPC .............. *B33Y 10/00* (2014.12); *B05D 1/265* (2013.01); *B29C 67/0055* (2013.01); *B29C 70/24* (2013.01); *B33Y 30/00* (2014.12); *C08J 5/005* (2013.01); *B29B 15/122* (2013.01); *B29K 2105/12* (2013.01); *B29K 2307/04* (2013.01); *C08J 2300/00* (2013.01)

(58) Field of Classification Search
None
See application file for complete search history.

(56) References Cited

U.S. PATENT DOCUMENTS

| | | |
|---|---|---|
| 5,121,329 A | 6/1992 | Crump |
| 5,936,861 A | 8/1999 | Jang et al. |

(Continued)

FOREIGN PATENT DOCUMENTS

EP 2676784 A1 12/2013

OTHER PUBLICATIONS

Wollan, "Pushtrusion Direct In-Line Long Fiber Thermoplastic (D-LFT) Compounding Technology Versus LFT Pellets and GMT Sheet," PlastiComp, Inc., copyright 2014, 6 pages.

(Continued)

*Primary Examiner* — Nathan T Leong
(74) *Attorney, Agent, or Firm* — Yee & Associates, P.C.

(57) ABSTRACT

A composite part is fabricated by rastering a deposition head over a substrate, and additively forming part features by extruding a polymer having an entrained continuous nanotube reinforcement from the deposition head onto a substrate.

18 Claims, 7 Drawing Sheets

(56) References Cited

U.S. PATENT DOCUMENTS

| | | | |
|---|---|---|---|
| 6,186,769 B1 | 2/2001 | Hawley | |
| 6,387,179 B1* | 5/2002 | Anderson | B29B 15/122 |
| | | | 118/125 |
| 6,431,847 B1 | 8/2002 | Hawley et al. | |
| 6,604,929 B2 | 8/2003 | Hawley et al. | |
| 6,676,864 B2 | 1/2004 | Hawley | |
| 6,875,385 B2 | 4/2005 | Hawley et al. | |
| 6,934,600 B2 | 8/2005 | Jang et al. | |
| 7,169,340 B2 | 1/2007 | Hawley | |
| 7,897,248 B2 | 3/2011 | Barrera et al. | |
| 7,993,122 B2 | 8/2011 | Bowen | |
| 7,993,620 B2 | 8/2011 | Lashmore et al. | |
| 8,231,303 B1 | 7/2012 | Bowen et al. | |
| 8,807,125 B1 | 8/2014 | Mathur et al. | |
| 2003/0236588 A1* | 12/2003 | Jang | B82Y 30/00 |
| | | | 700/119 |
| 2005/0280184 A1 | 12/2005 | Sayers et al. | |
| 2007/0116631 A1* | 5/2007 | Li | B82Y 30/00 |
| | | | 423/447.3 |
| 2007/0237959 A1 | 10/2007 | Lemaire | |
| 2008/0170982 A1 | 7/2008 | Zhang et al. | |
| 2009/0065965 A1 | 3/2009 | Bowen | |
| 2009/0258217 A1 | 10/2009 | Hoefflin et al. | |
| 2010/0126134 A1 | 5/2010 | Atkinson et al. | |
| 2011/0024694 A1* | 2/2011 | Shah | C08J 5/042 |
| | | | 252/502 |
| 2012/0085970 A1 | 4/2012 | Zhang et al. | |
| 2014/0134335 A1 | 5/2014 | Pridoehl et al. | |
| 2014/0232035 A1 | 8/2014 | Bheda | |
| 2014/0329085 A1 | 11/2014 | Kim et al. | |
| 2016/0082641 A1 | 3/2016 | Bogucki et al. | |

OTHER PUBLICATIONS

Bogucki et al., "Extruded Deposition of Fiber Reinforced Polymers," U.S. Appl. No. 14/489,972, filed Sep. 18, 2014, 32 pages.

Extended European Search Report, dated Mar. 29, 2016, regarding Application No. EP15180372.3, 9 pages.

Namiki et al. "3D Printing of Continuous Fiber Reinforced Plastic," Proceedings of the Society of the Advancement of Material and Process Engineering, Jun. 2014, 6 pages.

European Patent Office Communication dated Mar. 8, 2017, regarding Application No. 15180372.3, 5 pages.

Office Action, dated Jul. 27, 2017, regarding U.S. Appl. No. 14/489,972, 29 pages.

Notice of Allowance, dated Nov. 20, 2017, regarding U.S. Appl. No. 14/489,972, 11 pages.

* cited by examiner

EXTRUDED DEPOSITION OF POLYMERS HAVING CONTINUOUS CARBON NANOTUBE REINFORCEMENTS

CROSS REFERENCE TO RELATED APPLICATIONS

This application is a continuation-in-part of prior U.S. patent application Ser. No. 14/489,972, filed Sep. 18, 2014, now U.S. Pat. No. 9,931,778, the entire disclosure of which is incorporated by reference herein.

BACKGROUND INFORMATION

1. Field

The present disclosure generally relates to additive manufacturing techniques, and deals more particularly with a method and apparatus for deposition of polymers having continuous nanotube reinforcements.

2. Background

Additive manufacturing is a process in which physical parts are produced directly from a 3-D (three dimensional) CAD (computer aided design) file. In one type of additive manufacturing known as fused deposition modeling (FDM®) and sometimes referred to as 3-D printing, a part is produced by extruding small beads of thermoplastic polymer material to form layers of the material that solidifies after being extruded from a nozzle. The extrusion nozzle may be moved along a toolpath or "rastered" by a numerically controlled mechanism to build the part from the bottom up on a build platform, one layer at a time.

In order to increase the mechanical performance of parts produced by known additive manufacturing processes, such as FDM®, it has been proposed to introduce continuous or discontinuous fiber reinforcements into the thermoplastic as it is being extruded. In some applications, however the use of discontinuous fiber reinforcements such as chopped fibers may not provide the required mechanical strength. While the use of continuous fiber reinforcements is possible in extruded type additive manufacturing processes, limitations exist in the types of parts that can be produced, particularly those having finely detailed features that require relatively small print resolution. These limitations stem from the fact that known continuous fiber reinforcements are limited in the radial length in which the continuous fiber reinforcement can be bent, due to their stiffness Accordingly, there is a need for an additive manufacturing process such as FDM that allows fabrication of polymer parts with continuous reinforcements having finely detailed features requiring a high print resolution. There is also a need for an additive manufacturing method and apparatus for producing polymer parts having greater mechanical strength.

SUMMARY

The disclosed embodiments provide an additive manufacturing method and apparatus for fabricating polymer parts reinforced with continuous carbon nanotubes (CNTs). The continuous CNTs may be in the form of CNT yarn that is entrained into a molten bead of the polymer as the polymer is being deposited in layers to form features of the part, similar to fused deposition modeling. The embodiments permit fabrication of parts having fine details requiring high print resolution. The use of a continuous CNT reinforcement results in parts exhibiting improved performance, including greater mechanical strength.

According to one disclosed embodiment, a deposition fabrication method is provided, comprising establishing a pressurized stream of a polymer through a tube, and entraining a carbon nanotube reinforcement within the pressurized stream. The method also includes depositing a bead of the polymer and the carbon nanotube reinforcement from the tube onto a substrate. Entraining the carbon nanotube reinforcement includes, in one form, feeding a carbon nanotube yarn into the tube, and in another form, feeding aligned carbon nanotubes into the tube. Entraining the carbon nanotube reinforcement may include the feeding a continuous length of mechanically interlocked carbon nanotubes into the pressurized stream. The method may further comprise drawing the carbon nanotube reinforcement through the tube using the pressurized stream and capillary action, and entraining the carbon nanotube reinforcement includes continuously feeding the carbon nanotube reinforcement into the pressurized stream. The method may also include heating the carbon nanotube reinforcement to a glass transition of the polymer.

According to another disclosed embodiment, a method is provided of fabricating a composite part. The method includes providing a length of a carbon nanotube yarn, and providing a liquefied polymer. The method further comprises feeding the carbon nanotube yarn and the liquefied polymer into a deposition head, including entraining the carbon nanotube yarn within the liquefied polymer. The method also includes rastering the deposition head over a substrate, and additively forming features of the composite part by extruding the liquefied polymer having the carbon nanotube yarn entrained therein from the deposition head onto the substrate. The extruding includes forcing the liquefied polymer having the carbon nanotube yarn entrained therein through a tube and a die. The method may also include cutting the liquefied polymer having the carbon nanotube yarn entrained therein during rastering of the deposition head. Extruding the liquefied polymer and the carbon nanotube yarn reinforcement may be performed by introducing the liquefied polymer and the carbon nanotube yarn into an upstream end of a tube, forcing the liquefied polymer to flow through the tube to a downstream end of the tube, and drawing the carbon nanotube yarn through the tube to the downstream end of the tube by using the flow through the tube to drag the carbon nanotube yarn along with the flow through the tube. The method may further comprise using capillary action to assist in drawing the carbon nanotube yarn through the tube. Introducing the liquefied and the carbon nanotube yarn includes injecting the liquefied polymer under pressure around the carbon nanotube yarn. Providing the length of carbon nanotube yarn may include producing a plurality of carbon nanotube threads, and mechanically interlocking the carbon nanotube threads. Mechanically interlocking the carbon nanotube threads may be performed by spinning the carbon nanotube threads together, and producing the plurality of carbon nanotube threads includes aligning and coupling together a plurality of carbon nanotubes. Producing the plurality of carbon nanotube threads includes impregnating the carbon nanotubes with a polymer. According to a further disclosed embodiment, an additive manufacturing method is provided comprising entraining a continuous carbon nanotube yarn into a liquefied polymer, and extruding the liquefied polymer along with the carbon nanotube yarn from a deposition head onto a substrate The method also includes forming a composite part layer-by-layer, including rastering the deposition head over the substrate to form features of the composite part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
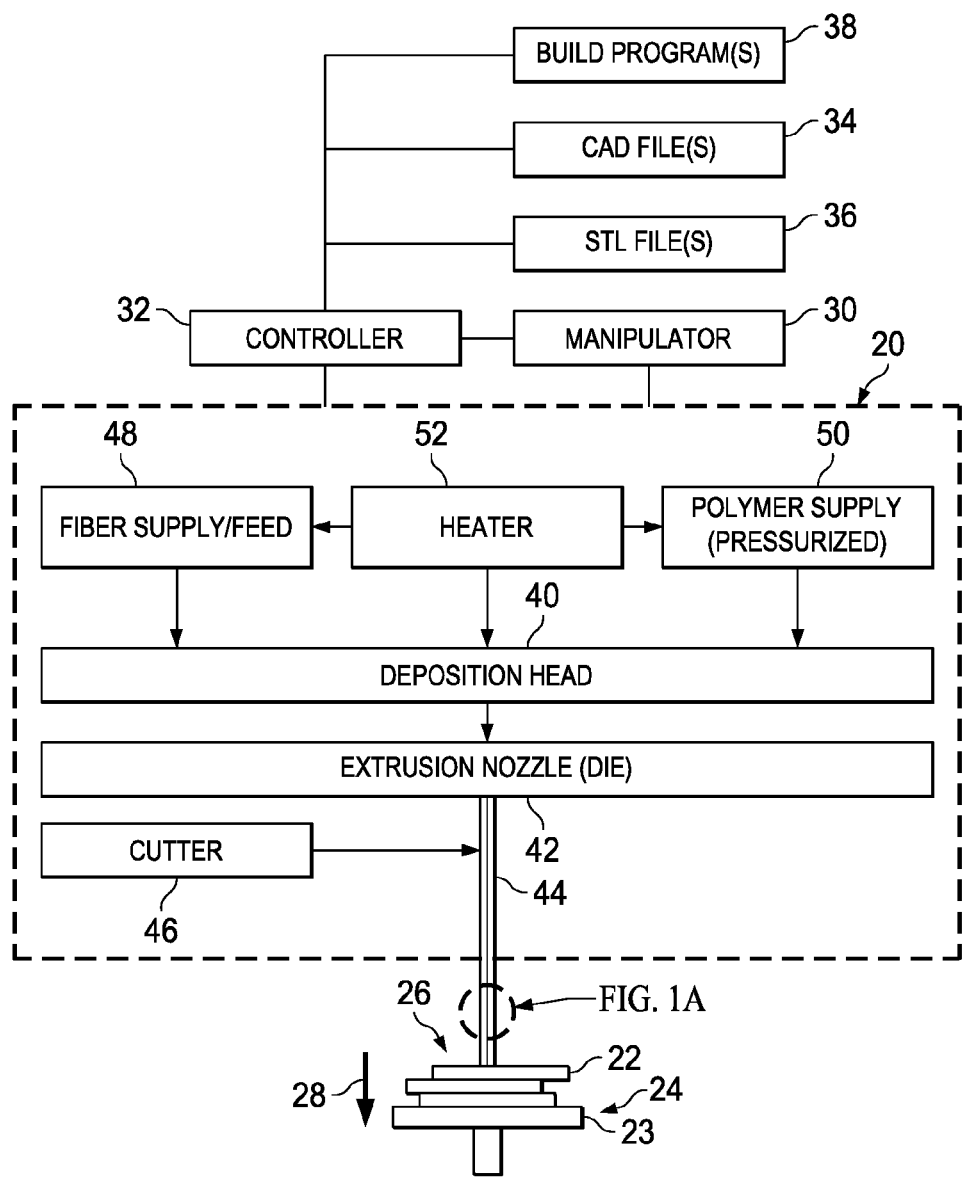
FIG. 1 is an illustration of an overall block and diagrammatic of apparatus for fabricating a polymer part having a continuous CNT reinforcement using an additive manufacturing technique.

Referring to FIG. 1, an additive manufacturing end effector 20 may be a rastered through three dimensional space over a substrate 23 such as a platform 24 by any suitable manipulator 30. The manipulator 30 may comprise, for example and without limitation, a numerically controlled gantry mechanism (not shown), and an articulated robotic arm (not shown) or a similar mechanism. Both the end effector 20 and the manipulator 30 are operated by the combination of a controller 32 and build programs 38 or similar software. The controller 32 may comprise, without limitation, a programmed special-purpose or general purpose computer, such as a PC (personal computer) or a PLC (programmable logic controller).

Figure 1A:
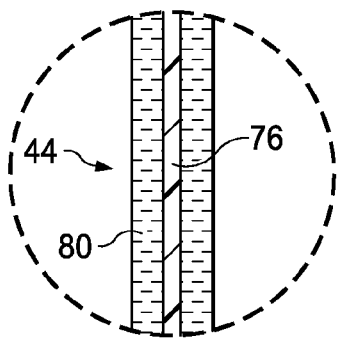
FIG. 1A is an illustration of the area designated as "FIG. 1A" in FIG. 1, parts of an extruded bead being broken away to reveal a continuous CNT reinforcement entrained in polymer.

The end effector 20 builds a three dimensional, CNT reinforced, polymer part 26, layer 22 by layer 22 on the platform 24 which moves down 28 as each reinforced polymer layer 22 is completed. The polymer part 26, sometimes referred to herein as a composite part 26, is defined by one or more CAD (computer aided design) files 34 which are converted to STL (stereolithography) format files 36 defining the surfaces of the part 26. Using the STL files 36, and one or more build programs 38, the controller 32 controls the operation of the end effector 20 and the manipulator 30. The manipulator 30 rasters the end effector 20 over the platform 24 to deposit molten beads 44 of soft, CNT reinforced polymer that subsequently solidify. As shown in FIG. 1A, each of the molten beads 44 comprises an extruded polymer 80 having a continuous CNT reinforcement 76 entrained therein. As the CNT reinforced polymer solidifies, the layers 22 fuse together to form the various features of the composite part 26.

The end effector 20 includes a deposition head 40 that may be provided with an extrusion nozzle or die through which a fiber reinforced molten bead 44 of reinforced polymer is deposited onto the platform 24, or onto an underlying layer 22. As mentioned above, the bead 44 includes a fiber reinforcement 76 (FIGS. 1, 2, 3 and 4) that is entrained in the extruded polymer 80 as the beads 44 are extruded to form the layers 22 which solidify and fuse together. The extrusion nozzle 42 may have a nozzle opening 42a (FIG. 2) for extruding a polymer bead 44 having the entrained fiber reinforcement 76. The nozzle opening 42a may have desired cross-sectional shape such as, without limitation, a circular, square, elliptical, ribbon or rectangular cross-sectional shape.

The end effector 20 further comprises a continuous CNT supply and feed 48, a pressurized polymer supply 50 and one or more suitable heaters 52. The polymer supply 50 may include one or more control valves and pressure regulators (not shown) as may be required for controlling the flow and pressure of polymer that is supplied to the deposition head 40. The heater 52 heats the polymer until it liquefies and becomes flowable, and may also provide heat to the deposition head 40 to maintain the polymer desired viscosity until the polymer 80 and entrained continuous CNT reinforcement 76 exit the extrusion nozzle 42. The desired polymer viscosity may depend on a variety of factors, including without limitation, the temperature to which the polymer is heated, the amount of heat absorption by the continuous CNT reinforcement 76, the particular polymer 80 being used and its shear rate, the ability of the continuous CNT reinforcement 76 to be wetted by the polymer 80, the desired rate of extrusion from the deposition head 40 and the rate at which the end effector 20 is rastered over the substrate 23. Generally, however, the polymer 80 should have a viscosity that is low enough to wet out the continuous CNT reinforcement 76 and be extruded from the deposition head 40.

Optionally, the heater 52 may be used to heat the continuous CNT reinforcement 76 before and/or as it is being fed into the deposition head 40 and becomes entrained in the polymer 80. The end effector 20 may also include a suitable cutter 46 which cuts the reinforced polymer bead 44 after a layer 22 has been deposited. The cutter 46 may comprise, for example and without limitation, a laser cutter, an ultrasonic knife or a mechanical cutter such as a guillotine blade (all not shown) that cuts through both the polymer 80 and the entrained continuous CNT reinforcement 76.

The polymer 80 supplied to the deposition head 40 may be any phase changeable polymer that reduces in viscosity when heated to at least its glass transition temperature, and then solidifies and hardens when cooled. For example, and without limitation, the polymer 80 drawn into the deposition head 40 from the polymer supply 50 may comprise any suitable amorphous or crystalline thermoplastic polymer, thermoset or a thermoplastic co-polymer.

Referring to FIG. 1A, the continuous CNT reinforcement 76 that is entrained in the polymer 80 may comprise one or more CNT filaments, strands, tows, rovings, or yarns that are suitable for the application. The continuous CNT reinforcement 76 may be dry or may be pre-impregnated with a polymer that is substantially the same as or is different than the polymer 80. It may also be possible to form the continuous CNT reinforcement encapsulating a CNT tow, roving or yarn in a first polymer that has a relatively high melt temperature, and then feed the encapsulated strand through the deposition head 40 where it is entrained within a second polymer 80 that has a melt temperature that is lower than that of the first polymer.

Figure 2:
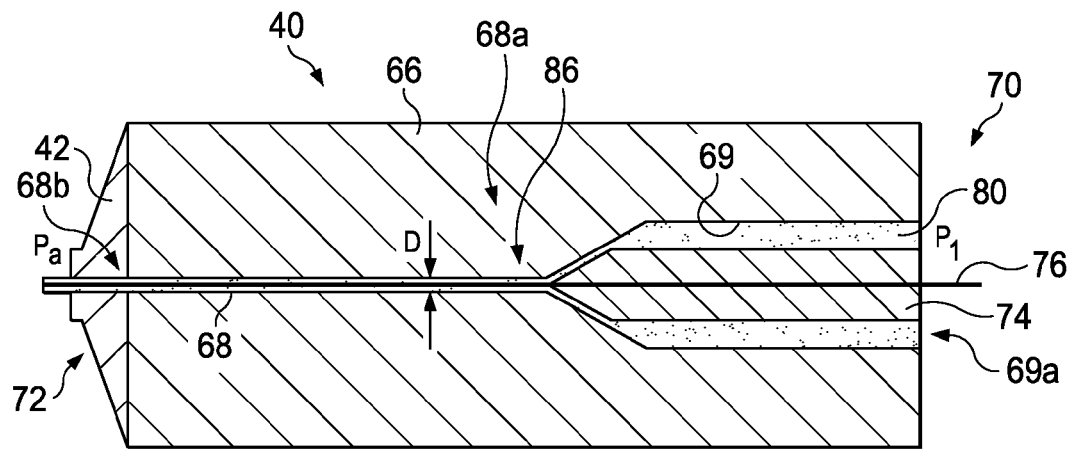
FIG. 2 is an illustration of a longitudinal sectional view of a deposition head which forms part of the apparatus shown in FIG. 1.

Attention is now directed to FIG. 2 which illustrates details of one embodiment of the deposition head 40 forming part of the end effector 20. The deposition head 40 includes an elongate entrainment barrel 66 having a material supply end 70, and a material deposition end 72 from which a molten bead 44 (FIG. 1) of continuous fiber reinforced polymer is extruded and deposited, as previously explained. The entrainment barrel 66 includes an internal capillary tube 68 having first upstream end 68a, and a second, downstream end 68b opposite the upstream end 68a. The capillary tube 68 extends longitudinally from the material deposition end 72 of the entrainment barrel 66 to a convergence region where the continuous CNT reinforcement 76 is introduced into and converges with a flowing stream of the polymer 80 that is introduced into the entrainment barrel 66 upstream of the convergence region 86.

When the continuous CNT reinforcement 76 is introduced into the flowing stream of the polymer 80, viscous interaction between the continuous CNT reinforcement 76 and the polymer 80 pulls the continuous CNT reinforcement 76 into the upstream end 68a of, and then through the capillary tube 68. Upon entering the convergence region 86, the continuous CNT reinforcement 76 becomes entrained in the flowing stream of polymer 80 and is carried along with the polymer 80 through the capillary tube 68 to the material deposition end 72 of the entrainment barrel 66 where the polymer 80 and the entrained continuous CNT reinforcement 76 are extruded together as a bead 44.

The downstream end 68b of the capillary tube 68 may be coupled with an extrusion die 42 in order to extrude a polymer bead 44 having a desired cross-sectional shape. In some applications, the extrusion die may not be necessary. The capillary tube 68 has an inside diameter "D" that will depend on a variety of factors, including the particular deposition application, the print resolution of the part, and the continuous CNT reinforcement 76 being used. The volume fraction of the continuous CNT reinforcement 76 contained in the polymer is a function of both the inside diameter "D" of the capillary tube 68, and the number and diameter of the strands that form the fiber reinforcement 76. The length of the capillary tube 68 may also affect the amount of entrained polymer-to-CNT strand interaction that is needed to move the continuous CNT reinforcement 76 though the capillary tube 68.

The material supply end 70 of the entrainment barrel 66 is provided with a centrally located guide tube 74 into which the continuous CNT reinforcement 76 may be longitudinally fed from the supply and feed 48 (FIG. 1). After being fed into the guide tube 74, the continuous CNT reinforcement 76 is guided in axial alignment with the capillary tube 68, and enters the convergence region 86 where is it converges with, is exposed to and becomes wetted by molten polymer that flows over the outside of guide tube 74 into the capillary tube 68. As the continuous CNT reinforcement 76 enters the convergence region 86, it becomes entrained within the polymer 80 flowing through the convergence region 86 into the capillary tube 68.

The material supply end 70 of the entrainment barrel 66 further includes an annular polymer passageway surrounding the guide tube 74. In one embodiment, flowable molten polymer 80 may be introduced into the annular polymer passageway 69 through a polymer inlet 69a at the material supply end 70 (as illustrated), in a direction generally parallel to the direction in which the continuous CNT reinforcement 76 is fed into the guide tube 74. Alternatively, in another embodiment (not shown), the flowable molten polymer 80 may be cross-fed through the side of the entrainment barrel 66 into the passageway 69 in a direction that is transverse to the direction in which the continuous CNT reinforcement 76 is fed into the guide tube 74.

Polymer 80 is injected from the polymer supply into the polymer inlet 69a at a pressure "$P_1$", and flows into through the annular passageway 69. The annular passageway 69 tapers and converges with the tapered end 74a of the guide tube 74, causing the flowing polymer 80 to flow past and over the continuous CNT reinforcement 76 into the upstream end 68a of the capillary tube 68. The pressure "$P_1$" is greater than atmospheric pressure "$P_a$" at the material deposition end 72 of the of the entrainment barrel 66, consequently a pressure differential of $P_1$-$P_a$ exists between the opposite ends 68a, 68b of the capillary tube 68. This pressure differential assists in drawing and entraining the continuous CNT reinforcement 76 into the flowing polymer 80.

The heater 52 shown in FIG. 1 may include one or more electric heating coils (not shown) that either surround or are embedded in the entrainment barrel 66. The heater 52 may be needed in some applications to provide the heat necessary to maintain the polymer 80 in a flowable state with a desired viscosity. It may be desirable to maintain the temperature of the entrainment barrel 66 at the material supply end 70 at a temperature that is greater than the temperature at the material deposition end 72 in order to assure adequate wetting of the continuous CNT reinforcement 76 as it is initially drawn into the capillary tube 68.

In use, a continuous CNT reinforcement 76, such as without limitation, as a CNT yarn, is loosely fed into the guide tube 74 such that it is not placed in any substantial amount of compression, i.e. it is not forced into the guide tube 74, and consequently buckling of the continuous CNT reinforcement 76 is avoided. As previously mentioned, the entrainment barrel 66 may be heated to a temperature that maintains the polymer 80 flowable and assures substantially complete wetting of the continuous CNT reinforcement 76. Polymer 80 under pressure $P_1$ is introduced into the polymer inlet 69a, filling the annular passageway 69, and establishing a flow of the polymer 80 through the convergence region 86 into the upstream end 68a of the capillary tube 68. The polymer pressure differential $P_1$-$P_a$ established between the polymer inlet 69a and the material deposition end 72 maintains the flow of polymer 80 to the capillary tube 68. In other words, the polymer 80 seeks to equilibrate by flowing from the polymer inlet 69a at a relatively high pressure $P_1$ to the material deposition end 72 at relatively lower pressure $P_a$.

The flow of the polymer 80 through the convergence region 86 produced by the pressure differential $P_1$-$P_a$, causes the polymer 80 to "grab" and draw the continuous CNT reinforcement 76 along with the flowing polymer 80 into the upstream end 68a of the capillary tube 68 where it becomes entrained in the polymer 80. Additionally, the continuous CNT reinforcement 76 is drawn through the capillary tube 68 by capillary action produced by intermolecular forces between the polymer 80 and the surrounding capillary tube 68. As the continuous CNT reinforcement 76 is drawn into the capillary tube 68, it becomes entrained within the flowing polymer 80 and is extruded and then deposited along with the polymer 80 in a molten bead 44 (FIG. 1) to form successive layers 22 of the part 26 as the end effector 20 is rastered over the substrate 23.

When a layer 22 or other feature of the part 26 has been formed, the cutter 46 severs the bead 44, and the polymer supply 50 may be shut off until the end effector 20 is ready to deposit the next layer 22. Severing of the bead 44 results in severing of both the polymer 80 and the continuous CNT reinforcement 76 entrained in the polymer 80. In some applications, it may be possible to temporarily interrupt feeding of the continuous CNT reinforcement 76 in order to deposit beads 44 that are purely polymer 80 (devoid of reinforcements) in order to form layers 22 that do not contain a reinforcement.

Figure 3:
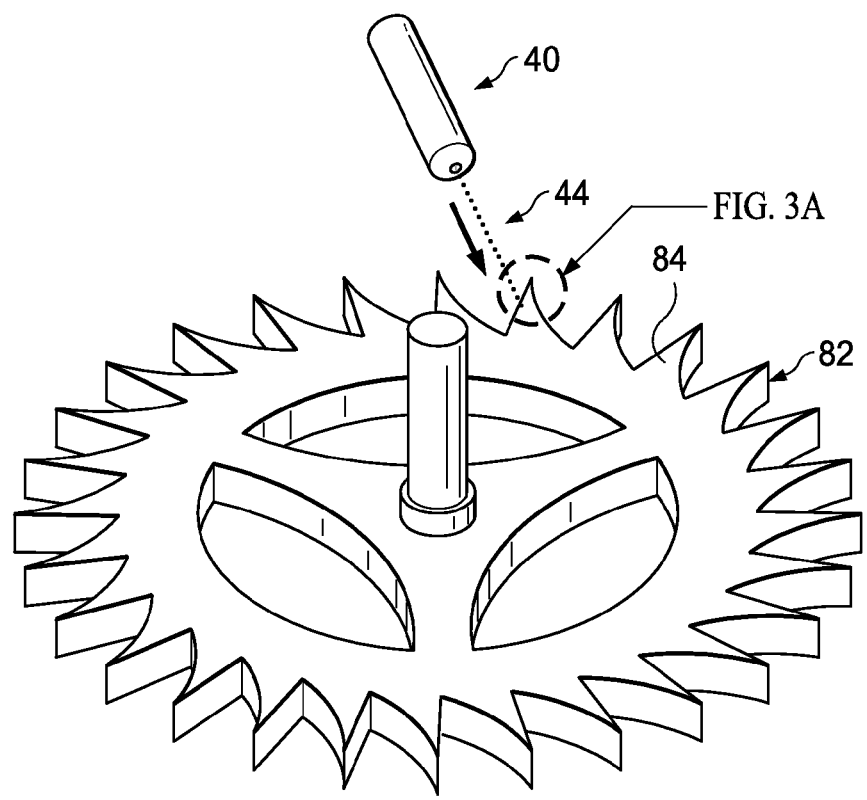
FIG. 3 is an illustration of a perspective view of a CNT reinforced polymer ratchet wheel fabricated using the apparatus shown in FIG. 1.
Figure 3A:
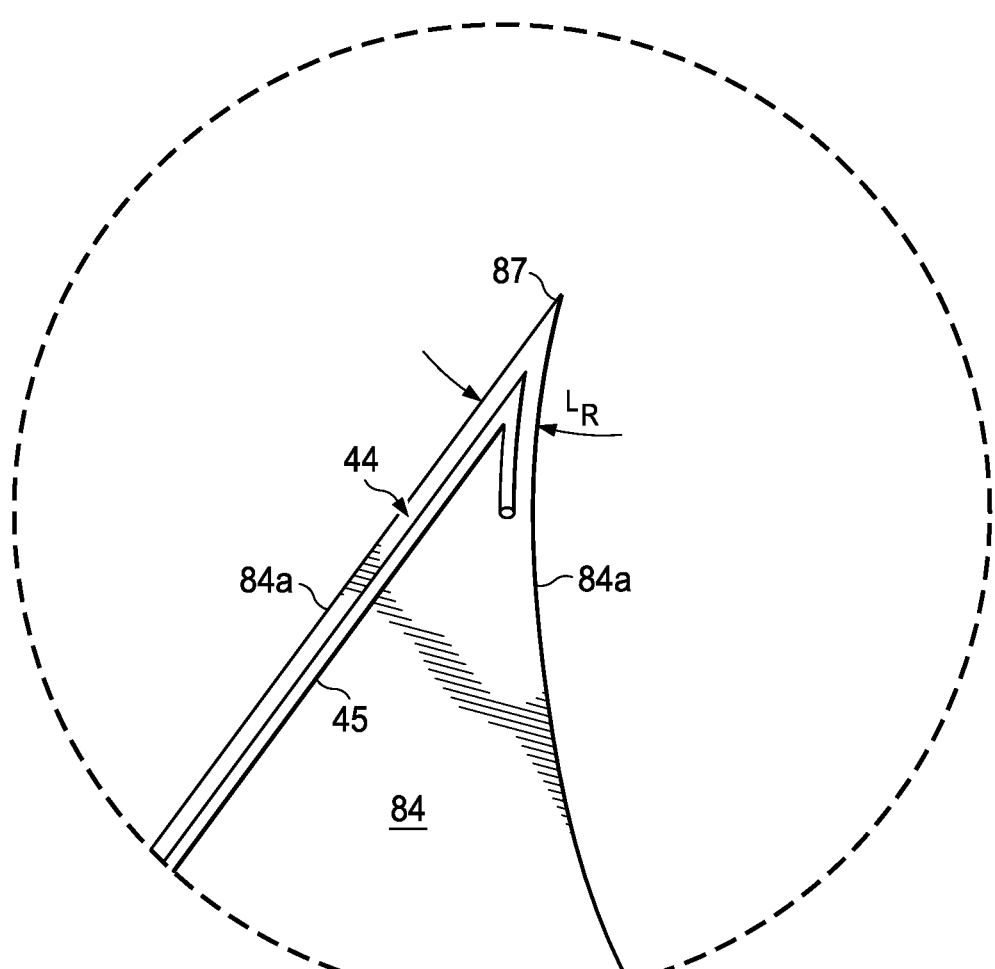
FIG. 3A is an illustration of the area designated as "FIG. 3A" in FIG. 3.

The disclosed embodiments may be employed to fabricate parts having features that are difficult to form and/or require high print resolution. For example, referring to FIGS. 3 and 3A, a ratchet gear 82 may be fabricated using the disclosed additive manufacturing method. Ratchet gear 82 has a plurality of circumferentially spaced gear teeth 84. Each of the gear teeth 84 includes a sharp corner 87 defined by two angularly arranged sides 84a separated by a relatively short radial length $L_R$. The ratchet gear 82, including each of the gear teeth 84, may be fabricated layer-by-layer using the deposition head 40 previously described. Each of the gear teeth 84 is formed by rastering the deposition head 40 along a path 45 corresponding to the profile of each tooth 84, including each of the sharp corners 87. In order to follow the shape of the sharp corners 87 during the deposition process, the reinforcement entrained in the polymer bead 44 must bend or deform along a radial length $L_R$ matching the shape of the corner 87. As will be discussed below in more detail, in accordance with the disclosed embodiments, the reinforcement may comprise a continuous CNT reinforcement that readily bends and deforms, as necessary to form highly detailed and/or sharp features such as the gear teeth 84.

Figure 4:
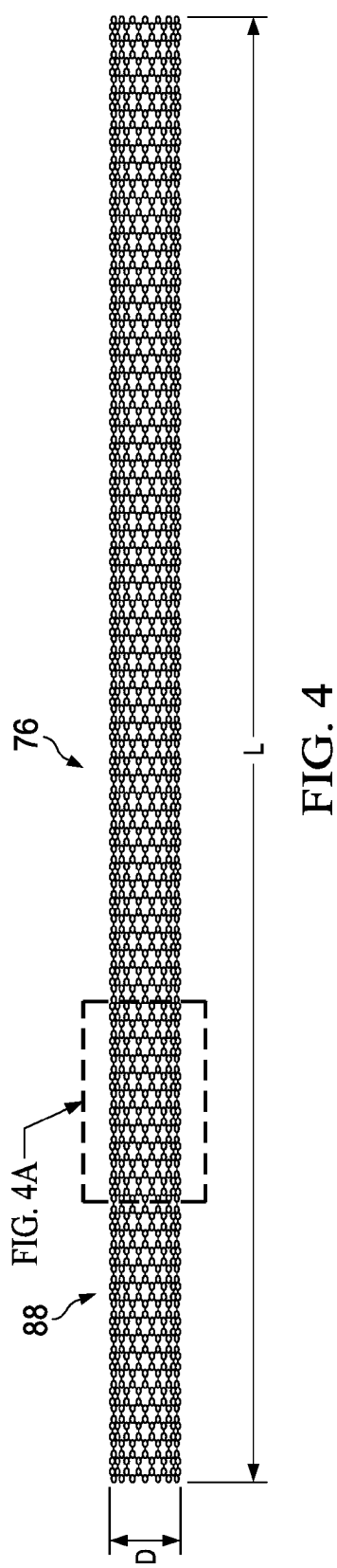
FIG. 4 is an illustration of an individual CNT thread.
Figure 4A:
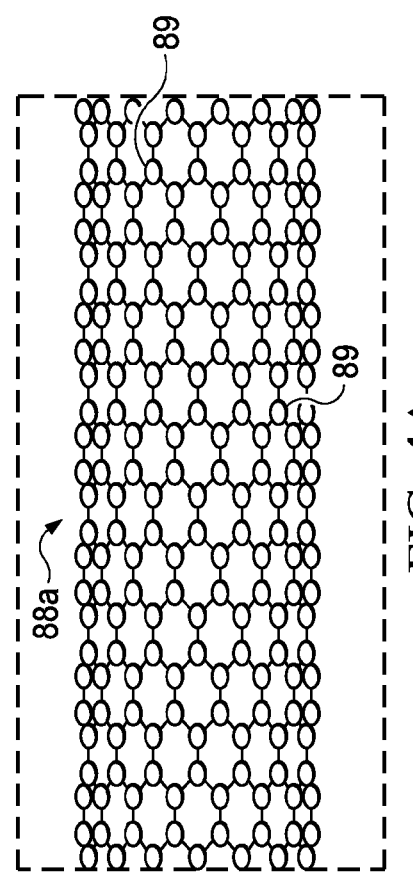
FIG. 4A is an illustration of the area designated as "FIG. 4A" in FIG. 4.

Attention is now directed to FIG. 4 which illustrates a chain 88 of individual CNTs 88a (FIG. 4A) that are aligned and coupled together, using known processing methods. For convenience of description, a chain 88 of individual CNTs 88a that are aligned and coupled together will be referred to as a CNT thread 88. CNTs 88a are a type of nano-scale material comprising tubular cylinders of carbon atoms 89 and have diameters "D" typically ranging from approximately less than 1 nanometer up to approximately 50 nanometers, and tube lengths "L" ranging from approximately several microns up to approximately several millimeters. These tubular cylinders may be of a single wall or a multi-wall type. CNTs 88a are exceptionally strong materials, and depending upon the type and length, they may exhibit at least approximately 200 times the strength and at least approximately 5 times the elasticity of steel. CNTs 88a also have excellent electrical and thermal properties.

Processes are known for producing a continuous flow of millimeter-length CNT threads 88, similar to a flow of "cotton candy" or aerogel. For example, in one process known as the CVD method, CNTs 88a are formed from a three-component mixture of grain alcohol, an iron catalyst and other ingredients that are fed into the injector of a CVD furnace (not shown). The vaporized mixture is transported through the furnace by a hydrogen carrier gas and heated to a preselected high temperature. The CNTs are harvested at the other end of the furnace. The aerogel of the CNTs is collected continually on a rotating "anchor" (not shown) at the end of the furnace. Next, continuous strands of the CNTs are pulled off from the anchor and deposited onto a rotating spool (not shown). Then, these thick strands are spun into CNT yarn approximately 20 to 30 microns in diameter.

Figure 5:
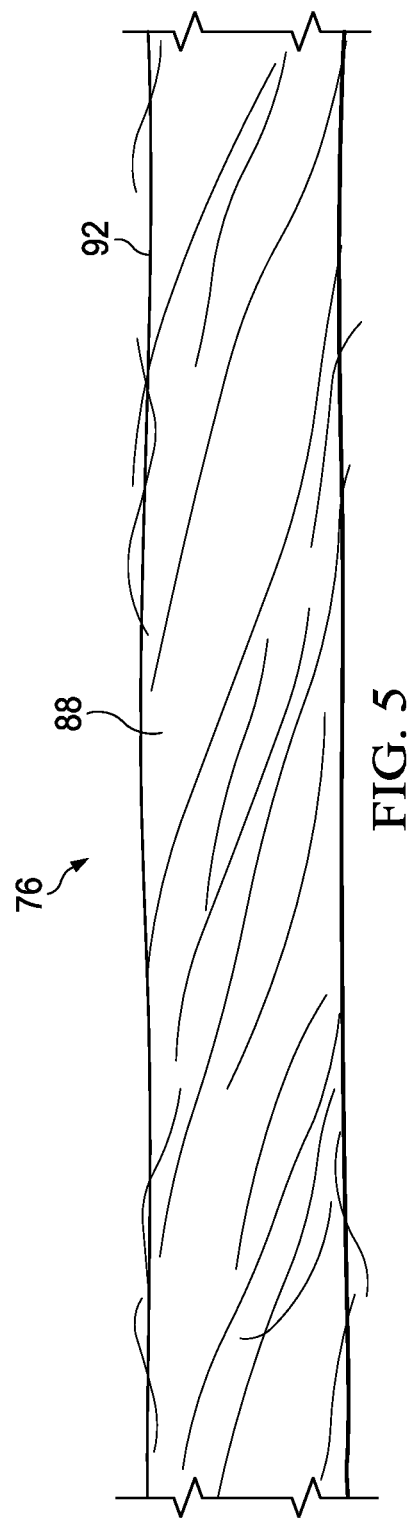
FIG. 5 is an illustration of a side view of one form of a CNT yarn.
Figure 6:
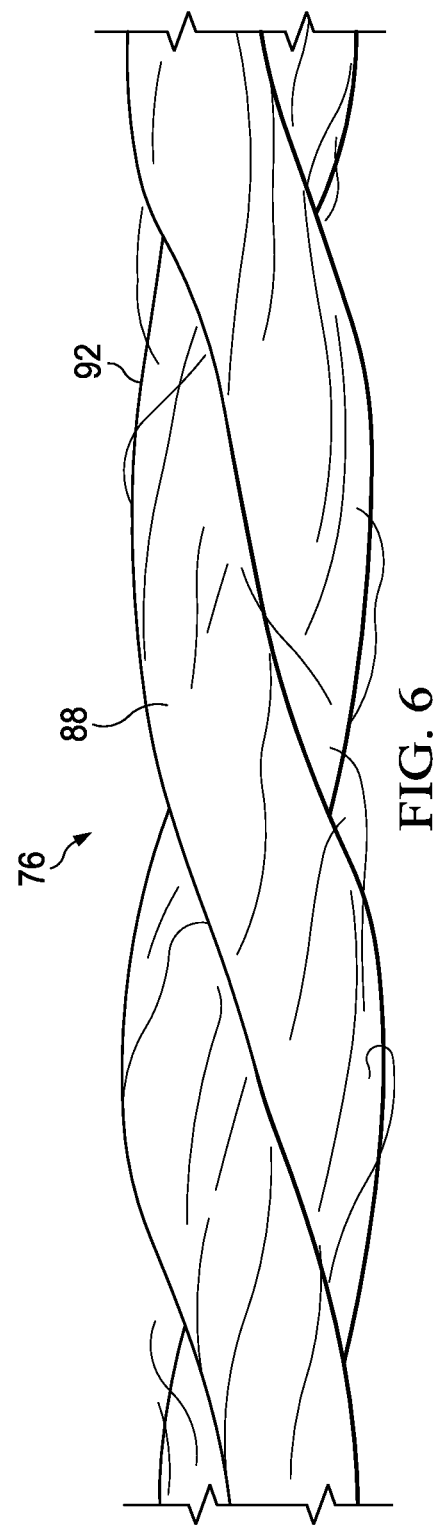
FIG. 6 is an illustration of a side view of another form of a CNT yarn.

Referring to FIG. 5, groups of the CNT threads 88 may be combined to form a continuous CNT reinforcement 76 using any of various types of known processes. For example, the CNT threads 88 may be combined into a continuous CNT reinforcement 76 by spinning the CNT threads 88 together into a CNT yarn 92, as previously mentioned. The CNT yarn 92 may be spun into various known twist configurations, and pre-impregnated, if desired, with a polymer binder. For example the CNT yarn 92 shown in FIG. 5 has a single twist, while FIG. 6 illustrates a CNT yarn 92 having a double helix twist. Other twist configurations are possible. Moreover, as previously indicated, the CNT threads 88 may be combined into other forms of continuous reinforcement that can be entrained within the polymer 80 flowing through the deposition head 40. When spun into a CNT yarn 92, the individual CNT threads 88 contact each other and become mechanically interlocked, allowing load transfer between the CNT threads 88, thereby acting as a single, continuous CNT reinforcement 76. However, although mechanically interlocked, the CNT threads 88 in the CNT yarn 92 are readily flexible, allowing the CNT yarn 92 to bend or deform to any desired shape, including shapes that require bending to a radius length that approaches zero. The ability of the CNT yarn 92 to readily bend allows the deposition head 40 to print part details with high resolution, and reduces or eliminates issues related to residual stress as well as breakage of the reinforcement. Depending on the application, other types of reinforcements may be combined with the CNT threads 88 and incorporated into the CNT yarn 92.

Figure 7:
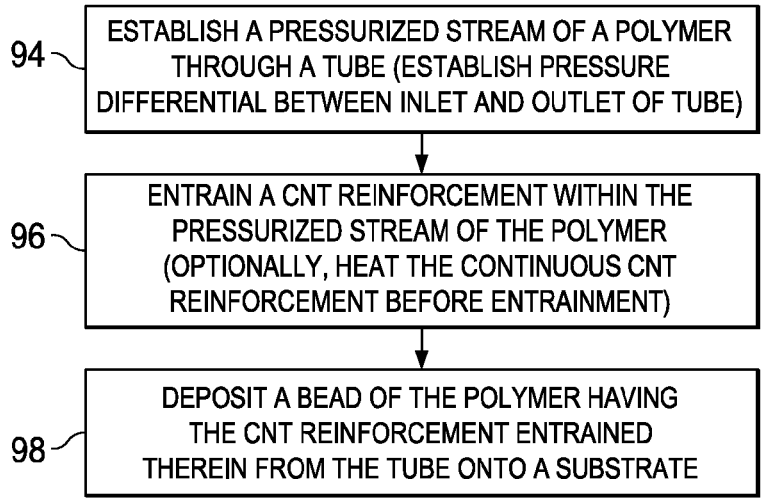
FIG. 7 is an illustration of a flow diagram of a deposition method.

Attention is now directed to FIG. 7 which broadly illustrates a deposition fabrication method employing an end effector 20 of the type described above. Beginning at 94, a pressurized stream of a polymer 80 is established through a tube 68 which may be a capillary tube. The pressurized stream of the polymer 80 may be established by establishing a pressure differential between the polymer inlet 69a (FIG. 2) and the downstream end 68b of the capillary tube 68. At 96, a continuous CNT reinforcement 76 is entrained within the pressurized polymer stream. In some embodiments, the method may optionally include heating the continuous CNT reinforcement 76 before it is entrained in the pressurized stream of the polymer 80. At 98, a bead 44 of the polymer 80 having the continuous CNT reinforcement 76 entrained therein is deposited from the tube onto a substrate 23. The pressurized stream of the polymer 80 may be established by supplying the polymer 80 to the upstream end 68a of the capillary tube 68 at a pressure $P_1$ that is higher than the pressure $P_a$ at which the polymer exists the downstream end 68b of the capillary tube 68 and is deposited from the material deposition end 72. Although the continuous CNT reinforcement 76 described above may be desired in certain applications requiring high part strength, alternatively, in other embodiments, a discontinuous CNT reinforcement 76 may be employed wherein the a multiplicity of individual CNTs 88a are entrained in the polymer 80 extruded from the deposition head 40. In this alternate embodiment, these individual CNTs 88a may or may not be aligned.

Figure 8:
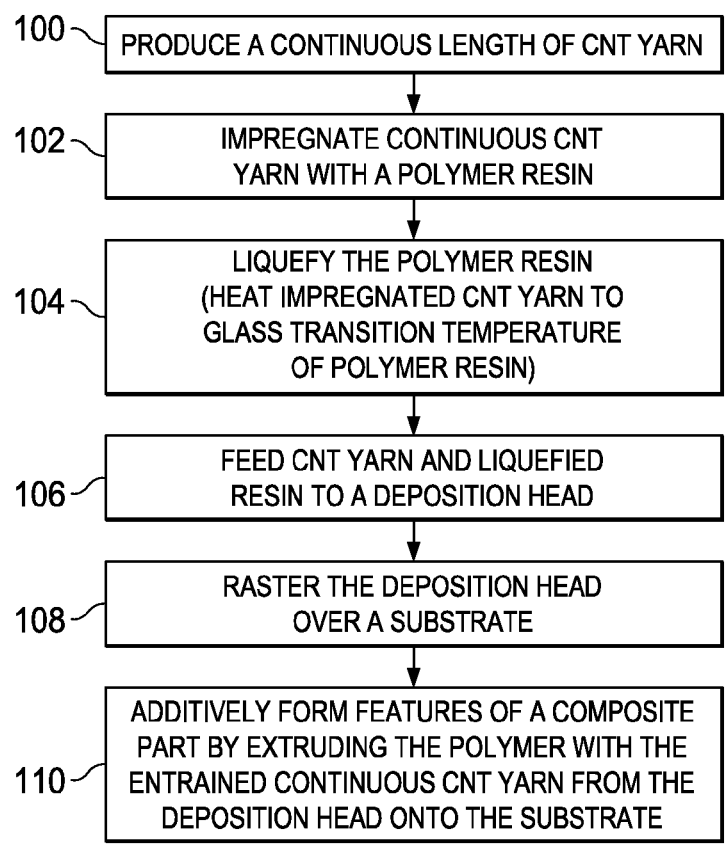
FIG. 8 is an illustration of a flow diagram of a method of additive manufacturing using a continuous CNT reinforcement.

FIG. 8 broadly illustrates a method of fabricating a composite part 26 by the additive manufacturing technique previously described, wherein the part 26 incorporates a continuous CNT reinforcement 76. At 100, a continuous length of a CNT reinforcement, such as a CNT yarn 92, is impregnated with a suitable polymer. At 104, the polymer is liquefied, for example by heating the impregnated CNT yarn 92 to at least the glass transition temperature of the polymer. At 106, the CNT yarn and liquefied polymer are fed to a deposition head. At 108, the deposition head is rastered over a substrate. At 110, features of a composite part are additively formed by extruding a polymer along with the entrained continuous CNT yarn from the deposition head onto the substrate.

Figure 9:
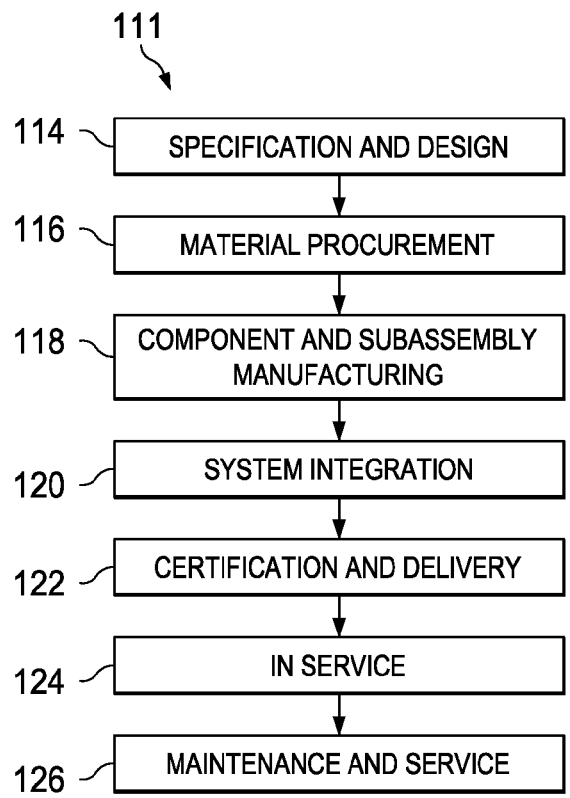
FIG. 9 is an illustration of a flow diagram of aircraft production and service methodology.
Figure 10:
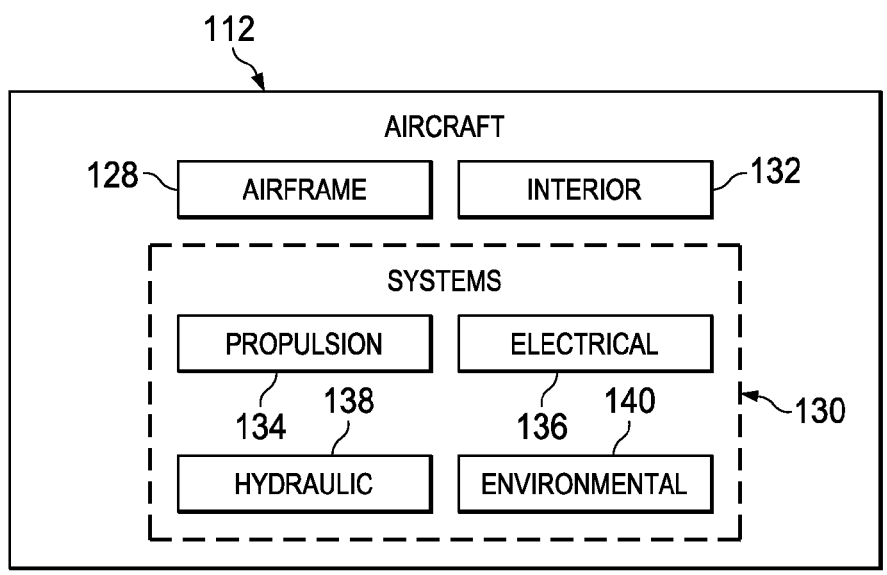
FIG. 10 is an illustration of a block diagram of an aircraft.

Embodiments of the disclosure may find use in a variety of potential applications, particularly in the transportation industry, including for example, aerospace, marine, automotive applications and other application where fiber reinforced polymer parts may be used. Thus, referring now to FIGS. 9 and 10, embodiments of the disclosure may be used in the context of an aircraft manufacturing and service method 111 as shown in FIG. 9 and an aircraft 112 as shown in FIG. 10. Aircraft applications of the disclosed embodiments may include, for example, without limitation, prototype components, low production run parts and reinforced structures that may be difficult or costly to manufacture using conventional processes. During pre-production, exemplary method 111 may include specification and design 114 of the aircraft 112 and material procurement 96. During production, component and subassembly manufacturing 118 and system integration 120 of the aircraft 112 takes place. During component and subassembly manufacturing 118, the disclosed method and apparatus may be employed to produce components or subassemblies that are then integration as part of the system integration 120. Moreover, the embodiments may be used to produce components that enable other components to be assembled together and/or integrated. Thereafter, the aircraft 112 may go through certification and delivery 122 in order to be placed in service 124. While in service 124 by a customer, the aircraft 112 is scheduled for routine maintenance and service 126, which may also include modification, reconfiguration, refurbishment, and so on. The disclosed embodiments may be used to fabricate parts or components that are used to repair or replace components as part of the maintenance and service 126.

Each of the processes of method 111 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 112 produced by exemplary method 111 may include an airframe 128 with a plurality of systems 130 and an interior 132. Examples of high-level systems 130 include one or more of a propulsion system 134, an electrical system 136, a hydraulic system 138 and an environmental system 140. Any number of other systems may be included. Although an aerospace example is shown, the principles of the disclosure may be applied to other industries, such as the marine and automotive industries. The disclosed embodiments may be employed to fabricate custom-designed, prototype or low production run fiber reinforced polymer components or parts used in the airframe 128, any of the systems 130 or the interior 132.

Systems and methods embodied herein may be employed during any one or more of the stages of the production and service method 111. For example, components or subassemblies corresponding to production process 118 may be fabricated or manufactured in a manner similar to components or subassemblies produced while the aircraft 112 is in service. Also, one or more apparatus embodiments, method embodiments, or a combination thereof may be utilized during the production stages 118 and 120, for example, by substantially expediting assembly of or reducing the cost of an aircraft 112. Similarly, one or more of apparatus embodiments, method embodiments, or a combination thereof may be utilized while the aircraft 112 is in service, for example and without limitation, to maintenance and service 126.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A deposition fabrication method, comprising:
establishing a pressurized stream of a first polymer through a tube, wherein the first polymer has a first melt temperature;
entraining a carbon nanotube reinforcement within the pressurized stream, wherein the carbon nanotube reinforcement is pre-impregnated with a second polymer that has a second melt temperature, wherein the second melt temperature is higher than the first melt temperature, and wherein entraining is performed above the first melt temperature but below the second melt temperature, wherein as a result of entraining a combined polymer is formed;
maintaining a third temperature at a material supply end of an entrainment barrel that contains the tube at a higher temperature than a fourth temperature at a material deposition end of the entrainment barrel; and
depositing a bead of the combined polymer from the tube onto a substrate.

2. The deposition fabrication method of claim 1, wherein entraining the carbon nanotube reinforcement includes feeding a carbon nanotube yarn into the tube.

3. The deposition fabrication method of claim 1, wherein entraining the carbon nanotube reinforcement includes feeding aligned carbon nanotubes into the tube.

4. The deposition fabrication method of claim 1, wherein entraining the carbon nanotube reinforcement includes feeding a continuous length of mechanically interlocked carbon nanotubes into the pressurized stream.

5. The deposition fabrication method of claim 1, further comprising:
drawing the carbon nanotube reinforcement through the tube using the pressurized stream and capillary action.

6. The deposition fabrication method of claim 1, further comprising:
pre-impregnating the carbon nanotube reinforcement with a polymer, and
wherein entraining the carbon nanotube reinforcement includes continuously feeding the carbon nanotube reinforcement into the pressurized stream.

7. The deposition fabrication method of claim 1, further comprising:
heating the carbon nanotube reinforcement to a glass transition of the first polymer.

8. The method of claim 1, wherein the first polymer is different than the second polymer.

9. A method of fabricating a composite part, comprising:
providing a length of a carbon nanotube yarn;
providing a liquefied polymer;
feeding the carbon nanotube yarn and the liquefied polymer into a deposition head, including entraining, through an entrainment barrel, the carbon nanotube yarn within the liquefied polymer, and wherein feeding and entraining further comprises:
feeding the carbon nanotube yarn into a guide tube disposed inside an annular inlet of the entrainment barrel, wherein the guide tube ends at an entrance to a capillary tube disposed inside the entrainment barrel;
flowing the liquified polymer into the annular inlet and around the guide tube, including flowing the liquified polymer past the guide tube and into the capillary tube via a convergence region in which the liquified polymer is allowed to flow onto the carbon nanotube yarn just as the carbon nanotube yarn enters the capillary tube;
rastering the deposition head over a substrate; and
additively forming features of the composite part by extruding the liquefied polymer having the carbon nanotube yarn entrained therein from the deposition head onto the substrate, wherein extruding includes extruding from the capillary tube that extends past an end of the entrainment barrel.

10. The method of claim 9, wherein the extruding includes forcing the liquefied polymer having the carbon nanotube yarn entrained therein through a tube and a die.

11. The method of claim 9, further comprising:
cutting the liquefied polymer having the carbon nanotube yarn entrained therein during rastering of the deposition head.

12. The method of claim 9, wherein extruding the liquefied polymer and the carbon nanotube yarn includes:
introducing the liquefied polymer and the carbon nanotube yarn into an upstream end of a tube,
forcing the liquefied polymer to flow through the tube to a downstream end of the tube, and
drawing the carbon nanotube yarn through the tube to the downstream end of the tube by using the flow through the tube to drag the carbon nanotube yarn along with the flow through the tube.

13. The method of claim 12, further comprising:
using capillary action to assist in drawing the carbon nanotube yarn through the tube.

14. The method of claim 12, wherein introducing the liquefied polymer and the carbon nanotube yarn includes injecting the liquefied polymer under pressure around the carbon nanotube yarn.

15. The method of claim 9, wherein providing a length of carbon nanotube yarn includes:
producing a plurality of carbon nanotube threads, and
mechanically interlocking the carbon nanotube threads.

16. The method of claim 15, wherein mechanically interlocking the carbon nanotube threads is performed by spinning the carbon nanotube threads together.

17. The method of claim 16, wherein producing the plurality of carbon nanotube threads includes aligning and coupling together a plurality of carbon nanotubes.

18. The method of claim 17, wherein producing the plurality of carbon nanotube threads includes impregnating the carbon nanotubes with a polymer.

* * * * *